United States Patent
Piller

(10) Patent No.: US 8,418,835 B2
(45) Date of Patent: Apr. 16, 2013

(54) FEEDER ASSEMBLY FOR RAW DOUGH BLANKS, ESPECIALLY DOUGH STRANDS PRE-FORMED FOR MAKING PRETZELS, AND METHOD OF FEEDING SUCH BLANKS

(76) Inventor: Oswald Piller, Karlsfeld (DE)

( * ) Notice: Subject to any disclaimer, the term of this patent is extended or adjusted under 35 U.S.C. 154(b) by 44 days.

(21) Appl. No.: 13/149,081

(22) Filed: May 31, 2011

(65) Prior Publication Data

US 2012/0138427 A1    Jun. 7, 2012

(30) Foreign Application Priority Data

Jun. 1, 2010  (DE) .......................... 10 2010 022 364

(51) Int. Cl.
   *B65G 47/31*    (2006.01)
(52) U.S. Cl.
   USPC .................................. 198/461.2; 198/461.1
(58) Field of Classification Search ............... 198/461.1, 198/461.2, 461.3
   See application file for complete search history.

(56) References Cited

U.S. PATENT DOCUMENTS

| | | | | |
|---|---|---|---|---|
| 2,545,667 | A * | 3/1951 | Malnati ........................ | 198/458 |
| 3,250,372 | A * | 5/1966 | Wagner et al. ................ | 198/396 |
| 3,827,545 | A * | 8/1974 | Buhayar .................... | 198/461.2 |
| 4,880,375 | A * | 11/1989 | Hayashi ........................ | 425/335 |
| 4,996,915 | A * | 3/1991 | Morikawa et al. ........... | 99/450.2 |
| 5,089,542 | A * | 2/1992 | Nishida et al. ................ | 523/410 |
| 5,178,891 | A * | 1/1993 | Morikawa et al. ............ | 426/502 |
| 6,003,417 | A * | 12/1999 | Finkowski ........................ | 83/76 |
| 6,227,349 | B1 * | 5/2001 | Finkowski et al. ........ | 198/461.2 |
| 7,383,937 | B2 * | 6/2008 | Perreault et al. ........... | 198/461.2 |

FOREIGN PATENT DOCUMENTS

| | | |
|---|---|---|
| DE | 29 10 527 A1 | 9/1980 |
| DE | 198 16 738 C2 | 3/2001 |
| DE | 199 01 640 C2 | 3/2003 |

OTHER PUBLICATIONS

Office Action issued in DE 10 2010 022 364.6 on Jul. 7, 2011.

* cited by examiner

*Primary Examiner* — James R Bidwell
(74) *Attorney, Agent, or Firm* — Miller Canfield Paddock and Stone; Mark L Maki

(57) ABSTRACT

Feeder assembly for raw dough blanks (3, 3'), especially for dough blanks for pretzel production, which comprises a first conveyor belt (1) and at least one second conveyor belt (2) which are arranged sequentially one after the other, said raw dough blanks (3) being disposed on the first conveyor belt (1) at the beginning of the feeding process and being transferred from first conveyor belt (1) to second conveyor belt (2), with the speed of the at least one second conveyor belt (2) higher by a given amount that the speed of the first conveyor belt, whereby the raw dough blanks (3) are stretched and aligned in parallel with the direction of movement of second conveyor belt (2) when transferred from first conveyor belt (1) to second conveyor belt (2). (FIG. 1)

9 Claims, 1 Drawing Sheet

FEEDER ASSEMBLY FOR RAW DOUGH BLANKS, ESPECIALLY DOUGH STRANDS PRE-FORMED FOR MAKING PRETZELS, AND METHOD OF FEEDING SUCH BLANKS

CROSS REFERENCE TO RELATED APPLICATIONS

This application claims the priority of German application number, DE 10 2010 022 364.6, filed on Jun. 1, 2010. The application is incorporated herein by reference in its entirety.

FIELD OF THE INVENTION

The present invention relates to a feeder assembly for bake-off or raw dough blanks, and especially to a feeder device for raw dough strands pre-formed for pretzel production. The invention also relates to a method of feeding raw dough blanks to apparatus for processing same.

BACKGROUND OF THE INVENTION

Feeder devices for linear raw dough blanks—such as raw dough strands pre-formed for pretzel production—have been known from prior art. Apparatus of this kind usually precedes a device for processing the raw dough blanks, such as a pretzel looping device.

Before the raw dough blanks can be and are processed by means of the device intended therefor, it usually is necessary, however, to stretch, measure or size, and align them. Further, means are frequently needed to sort out under-size or over-size blanks as processing devices usually require blank size to be within pre-determined limits.

Due to this necessity of stretching, measuring or sizing, and aligning the raw dough blanks, it has been known from prior art to provide between the feeding device and processing apparatus additional equipment capable of performing such stretching, measuring and aligning. The additional equipment, which increases the manufacturing and installation cost for the system as a whole, and the considerable delay caused by the additional steps in the production of the raw dough blanks between such feeding and the processing, constitute a distinct drawback.

On this basis, the object underlying the present invention is the provision of feeder means for raw dough blanks, especially raw dough strands pre-formed for pretzel production, the use of which greatly simplifies and accelerates the production to be based on such bake-off items.

In particular, it is desired to stretch, size and align the raw dough blanks as they are conveyed. Further, the inventive feeder apparatus is designed to enable under-sized or over-sized raw dough blanks to be sorted out before they can be passed on to processing apparatus.

The invention is intended also to propose a method of feeding raw dough blanks to equipment for processing them, with the execution of said method enabling the raw dough blanks to be stretched, sized and aligned as they are conveyed and fed to such equipment.

This object is attained for feeder means wherein a first conveyor belt and at least one second conveyor belt are arranged sequentially one after the other, with the raw dough blanks disposed on the first conveyor belt at the beginning of the feeding process and being transferred from said first conveyor to a second conveyor belt, and wherein the speed of the second conveyor belt is higher by a given amount than the speed of the first conveyor belt, whereby raw dough blanks, when being transferred from first conveyor belt to the second conveyor belt, are stretched and aligned to be parallel with the direction of movement of second conveyor belt. The following description also teaches a method of feeding raw dough blanks to the apparatus for processing them. The description also teaches additional inventive developments and advantages.

Accordingly, the invention proposes feeder apparatus for raw dough blanks, especially raw dough strands pre-formed for pretzel production, which comprises a first conveyor belt and at least one second conveyor belt, said conveyor belts arranged sequentially one behind the other, with the dough blanks disposed on the first conveyor belt as the feeding process begins and being transferred from the first conveyor belt to the at least one second conveyor belt.

In accordance with the invention, provisions are made for the speed of the at least one second conveyor belt being higher by a given amount than the speed of the first conveyor belt. This ensures advantageously that the dough blanks during the transfer thereof from the first to the second conveyor belt are stretched and aligned in parallel with the direction of movement of said second conveyor belt, as each dough blank is pulled ahead by the second and faster conveyor belt, resulting in the dough blanks being stretched and aligned as they are transferred.

At the beginning of the feeding process, the dough blanks may be arranged in parallel with the direction of movement of the first conveyor belt. Alternatively, the dough blanks may be arranged in a direction substantially non-parallel with the movement of the first conveyor belt and may instead move at an angle to the longitudinal axis of the first conveyor belt, and/or they may be shaped to be non-linear.

Within the framework of an advantageous further development of the invention, the adhesive friction coefficient of the at least one second conveyor belt may be selected to be higher than the first conveyor belt's so that "idling" of the second conveyor belt may be avoided especially in the case of higher-weight dough blanks.

Further, and in accordance with a further development of the invention, the inventive transfer device includes a sensor which detects the end turned away from the first conveyor of a raw dough blank transported by and arriving on the second conveyor and is damped by it, with the sensor maintaining its damped response until the raw dough blank is not within the sensor's detection range any longer. If a plurality of second conveyors is provided, each such second conveyor has a sensor associated with it.

In accordance with the invention, the length of the stretched raw dough blank aligned in parallel with the conveying direction of the second conveyor belt is determined in a controller which is coupled with the sensor and evaluates the period of time for which the sensor is damped, as well as the conveying speed of the second conveyor belt. In case the length so determined of the raw dough blank is greater or smaller than a target length plus/minus a prescribed length offset, the second conveyor belt is controlled to make the blank reach the end of the second conveyor belt where continued circulation thereof causes the blank to be transferred to a container or to another conveyor, resulting in it being sorted out.

If the length so determined of the raw dough blank corresponds to the target length plus/minus a prescribed length offset, the invention provides for the raw dough blank to be transported until it assumes a centered position relative to, or on, the longitudinal axis of another conveyor or of a transfer chute to be passed on to means for processing the raw dough blank. Preferably, such other conveyor or transfer chute is disposed at right angles to second conveyor belt 2. Also, the length offset may assume a value of zero.

Once the raw dough blank has reached this position the first and second conveyor belts are stopped and the raw dough blank is transferred by suitable means from the second conveyor belt to the other conveyor or the transfer chute. Following such transfer of the raw dough blank, the conveyor belts are re-activated to move.

The means for transferring the raw dough blank to the other conveyor or to the transfer chute may have the form of a pusher device adapted to be driven mechanically, pneumatically, hydraulically or electrically.

Alternatively, transfer to the transfer chute or to the other conveyor of a raw dough blank disposed centrally relative to the longitudinal axis thereof may be effected by the second conveyor belt having the form of a "V-belt" comprising a pair of belt runs disposed for transporting the raw dough blanks in a parallel and contiguous relationship and driven with the same speed, said two conveyor belts having a first position in which their top runs span a common plane for transporting said raw dough blanks, and a second position rotated about an axis parallel with the longitudinal axis, or about the longitudinal axis thereof, in which the top runs of the conveyor belts assume a given angle relative to each other so that the raw dough blanks may be transferred by gravity to the underlying transfer chute or to the underlying other conveyor. After a transfer so effected of the raw dough blanks, both conveyor belts re-assume the first position in which they are parallel and contiguous with each other.

The inventive concept results in a transfer arrangement which operationally enables the raw dough blanks to be stretched, sized and—if desired—to be sorted out in transfer. In this context, it is noted that it is not possible to sort out dough blanks in the stretching and aligning devices known from prior art.

In accordance with the invention, the first and the at least one second conveyor belt may have the same longitudinal axis or longitudinal axes parallel with each other, or the conveyor belts may be disposed in any desired angular relationship. It is possible furthermore that the first and the at least one second conveyor belts are driven by a single drive unit, with different conveyor speeds obtained in this case by reducing or increasing the drive unit's output speed by means of suitably dimensioned gears, for example. Alternatively, the conveyor belts may each have a separate drive unit associated therewith.

Within the scope of an advantageous further development of the invention, and for feeding a plurality of devices for processing the raw dough blanks, the first conveyor belt may be followed a plurality of second conveyor belts each associated with a separate device for processing raw dough blanks. In this case, the width of the first conveyor belt is chosen so that the raw dough blanks may be transferred simultaneously to the plurality of second conveyor belts; such second conveyor belts may each be disposed at any given angle relative to the first conveyor belt.

BRIEF DESCRIPTION OF THE DRAWINGS

The invention will now be explained in greater detail under reference to the attached figures.

DETAILED DESCRIPTION

Figures 1, 2:
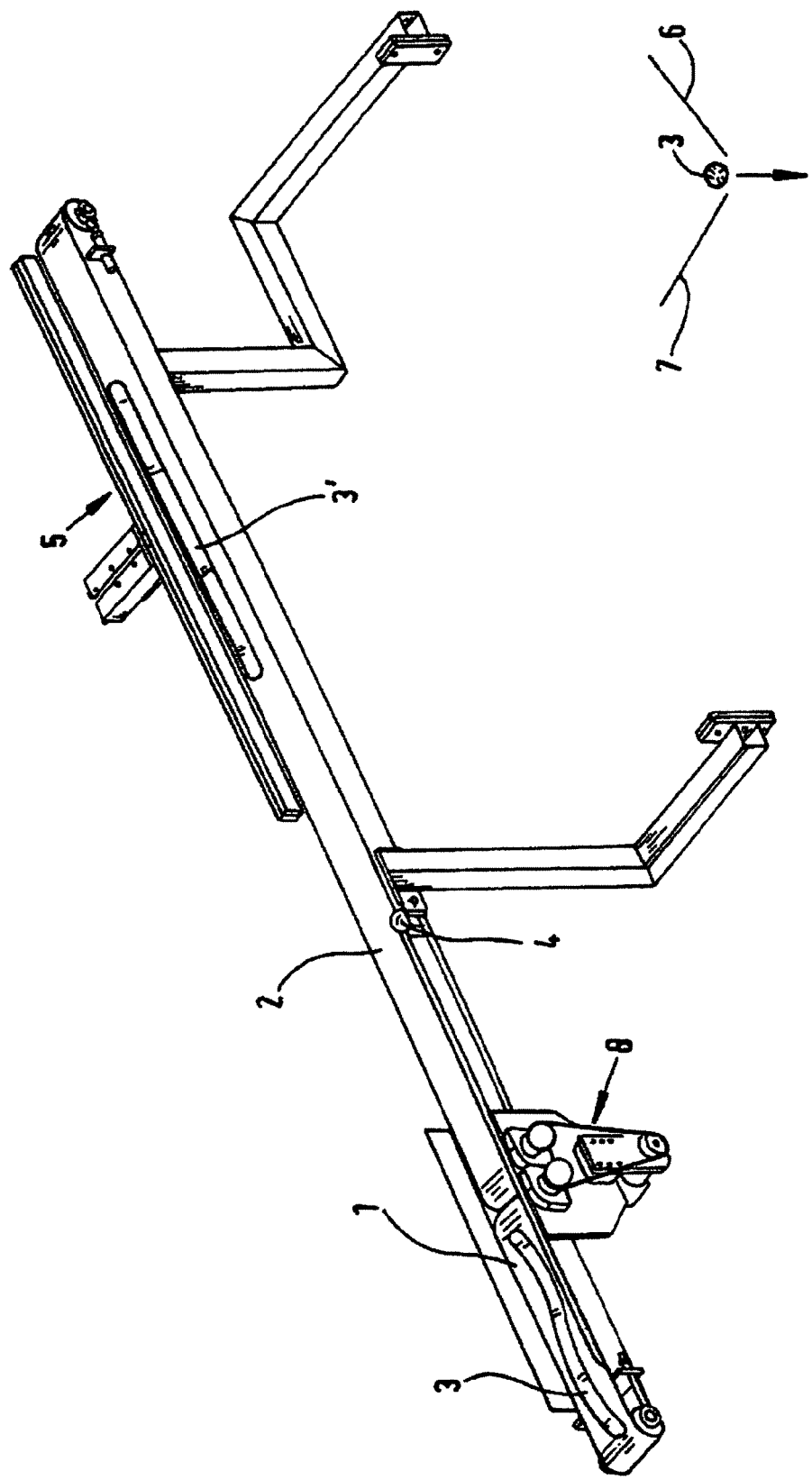
FIG. 1: A perspective view of an assembly, configured in accordance with a first embodiment of the invention and including a second conveyor belt, for feeding straight raw dough blanks especially preformed for pretzel production.
FIG. 2: A schematic section of a V-belt in accordance with the invention for illustrating their relative positions of the conveyor belts in the second position for blank transfer.

In accordance with the invention and relative to FIG. 1, an inventively configured feed assembly for raw dough blanks, and particularly for lengths of dough strand pre-formed for pretzel production, comprises a first conveyor belt 1 and a second conveyor belt 2 disposed sequentially one behind the other. At the beginning of the feed process, the raw dough blanks 3 are in this example disposed substantially in parallel with the direction of movement of first conveyor belt 1 and are transferred from first conveyor belt 1 to second conveyor belt 2.

In accordance with the invention, the speed of second conveyor belt 2 is supposed to be higher by a given amount than the speed of first conveyor belt 1, ensuring that, upon transfer from the first to the second conveyor belt, the raw dough blanks 3 are stretched and aligned in parallel with the direction of movement of second conveyor belt 2. To this end, the raw dough blank 3 being transferred is pulled ahead by the faster second conveyor belt 2, causing the blank to be stretched and aligned when so transferred.

Further, the illustrated inventive transfer assembly comprises a sensor 4 which detects the end turned away from first conveyor belt 1 of the raw dough blank 3 arriving on second conveyor belt and is damped by that end, with sensor 4 maintaining its damped response until the raw dough blank 3 is not within the detection range of sensor 4 any longer due to the movement of second conveyor belt 2.

From the damped response of the sensor and the speed of movement of second conveyor belt 2, a controller determines the length of the raw dough blank 3 stretched and aligned in parallel with the direction of movement of second conveyor belt 2, with the controller operating to so control second conveyor belt 2 that, if the length of raw dough blank 3 so determined is greater or smaller than some target length plus/minus a given length offset, the said raw dough blank reaches the end of second conveyor belt 2 where further circulation of conveyor belt 2 causes it to be transferred to a container or to another conveyor belt and, thus, to be sorted out.

If the length so determined of raw dough blank 3 corresponds to the target length plus/minus a given length offset, second conveyor belt 2 continues to transport raw dough blank 3 until it assumes a centered position on the longitudinal axis of another conveyor or of a transfer chute for raw dough blanks 3, 3' to be passed on thereby to processing means.

Preferably, the other conveyor or the transfer chute is disposed to be perpendicular to second conveyor belt 2. In FIG. 1, reference character 3' designates a raw dough blank in a centered position on the longitudinal axis of another conveyor or of a transfer chute (not shown) to be passed on thereby to dough blank processing means.

When raw dough blank 3' has reached the said centered position, the first and second conveyor belts 1, 2 are stopped and raw dough blank 3' is transferred from second conveyor belt 2 to said other conveyor or to the transfer chute by means suited for transferring raw dough blanks centered with respect to the longitudinal axis of the other conveyor belt or transfer chute, respectively.

Following the transfer of raw dough blank 3', conveyor belts 1, 2 are re-activated to move. In the example shown in FIG. 1, the device for transferring raw dough blank 3'—located centrally with respect to the longitudinal axis of another conveyor belt or a transfer chute—to dough blank processing means is designed to form a pusher device 5 adapted to be driven mechanically, pneumatically, hydraulically or electrically.

As explained above, an alternative to pusher device 5 for transferring the raw dough blank 3' then located centrally with respect to the longitudinal axis of the other conveyor belt or the transfer chute is to design second conveyor belt 2 as a "V-belt" comprising a pair of belts 6, 7 disposed to be parallel and contiguous and moved at the same speed for transporting the raw dough blanks 3, said belts 6, 7 adapted to be rotated about an axis parallel to the longitudinal axis, or about the longitudinal axis thereof, from a first position in which the top runs of belts 6, 7 span a common plane to a second position in which the top runs of belts 6, 7 assume given angular positions relative to each other so that raw dough blank 3 may be transferred by gravity to the underlying transfer chute or to the underlying other conveyor.

This second position of belts 6, 7 is shown in FIG. 2. Following the transfer of raw dough blanks 3, both belts re-assume their first positions, in which they are parallel and contiguous with each other.

In the example shown in FIG. 1, a drive unit 8—preferably in the form of an electric motor—is provided for driving first and second conveyor belts 1, 2, with the different speeds of the conveyor belts obtained from the drive unit output speed by gears dimensioned to provide the desired transmission ratios.

As is evident from the above description of the invention, there is also provided a method of feeding raw dough blanks 3, 3' to apparatus for processing same, with the raw dough blanks 3 initially disposed on a first conveyor belt 1 and transferred from first conveyor belt 1 to a second conveyor belt 2, and with the speed of second conveyor belt 2 adjusted to be higher by a given amount than the speed of first conveyor belt 1, whereby the raw dough blanks 3 are stretched and aligned to be parallel with the direction of movement of second conveyor belt 2 as they are transferred from the first conveyor belt 1 to the at least one second conveyor belt 2.

Within the scope of the inventive method, provisions may be included to have sensor 4 detect the end turned away from conveyor belt 1 of an arriving raw dough blank 2 transported by second conveyor belt 2, with sensor 4 being damped thereby and maintaining its damped response until raw dough blank 3 is not within the detection range of sensor 4 any longer due to the movement of second conveyor belt 2, with the length of the raw dough blank 3 stretched and aligned to be parallel with the direction of movement of second conveyor belt 2 being determined in a controller from the damping period of sensor 4 and the speed of movement of second conveyor belt 2, and, if the length so determined of raw dough blank 3 is greater or smaller than a target length, the controller operating to so control second conveyor belt 2 that said raw dough blank reaches the end of second conveyor belt 2 where it is transferred to a container or to another conveyor by continued circulation of conveyor belt 2, resulting in the raw dough blank being sorted out. If the length so determined of raw dough blank 3 corresponds to the target length plus/minus a given length offset, second conveyor belt 2 continues to transport raw dough blank 3 until it assumes a centered position on the longitudinal axis of another conveyor, or of a transfer chute, for continued transport of raw dough blanks 3, 3' to said dough blank processing means.

The invention claimed is:

1. A feeder assembly for raw dough blanks which are formed as lengths of dough strand that are pre-formed for the production of pretzels, comprising the improvement wherein a first conveyor belt and at least one second conveyor belt are arranged sequentially one after the other, with the raw dough blanks being disposed on said first conveyor belt at a beginning of a feeding process and being transferred from said first conveyor to said at least one second conveyor belt, and wherein a speed of the at least one second conveyor belt is higher by a given amount than a speed of the first conveyor belt, such that said raw dough blanks, when being transferred from said first conveyor belt to said second conveyor belt, are stretched and aligned to be parallel with a direction of movement of said second conveyor belt to form lengths of dough strand which is pre-formed for the production of pretzels, the first conveyor belt and said at least one second conveyor belt each having a respective adhesive coefficient of friction wherein the adhesive friction coefficient of said at least one second conveyor belt is higher than the adhesive friction coefficient of said first conveyor belt.

2. Feeder assembly for raw dough blanks as claimed in claim 1, wherein, for serving a plurality of devices for processing raw dough blanks, said first conveyor belt is followed by a plurality of said second conveyor belts each associated with a raw dough blank processing device, with the width of said first conveyor belt being selected to enable the raw dough blanks to be transferred simultaneously to said second conveyor belts.

3. Feeder assembly for raw dough blanks as claimed in claim 1, wherein said first conveyor belt and the at least one second conveyor belt have the same longitudinal axis, or longitudinal axes disposed in parallel with each other, or are arranged to extend at any angle relative to each other.

4. A feeder assembly for raw dough blanks which are formed as lengths of dough strand that are pre-formed for the production of pretzels, comprising the improvement wherein a first conveyor belt and at least one second conveyor belt are arranged sequentially one after the other, with the raw dough blanks being disposed on said first conveyor belt at a beginning of a feeding process and being transferred from said first conveyor to said second conveyor belt, and wherein a speed of the at least one second conveyor belt is higher by a given amount than a speed of the first conveyor belt, such that said raw dough blanks, when being transferred from said first conveyor belt to said second conveyor belt, are stretched and aligned to be parallel with a direction of movement of said second conveyor belt to form lengths of dough strand which is pre-formed for the production of pretzels, the first conveyor belt and said at least one second conveyor belt each having a respective adhesive coefficient of friction wherein the adhesive friction coefficient of said at least one second conveyor belt is higher than the adhesive friction coefficient of said first conveyor belt, and a sensor being provided which detects an end turned away from said first conveyor belt of said raw dough blank transported by and arriving on said second conveyor belt and which said sensor is damped by said end, with said sensor maintaining a damped response for a damping time until the raw dough blank is not within the sensor's range of detection any longer, a control unit being provided which is operable to determine a length of the stretched raw dough blank aligned in parallel with the direction of movement of said second conveyor belt on the basis of the damping time of said sensor and the speed of movement of said second conveyor belt.

5. Feeder assembly for raw dough blanks as claimed in claim 4, wherein, if the length of said raw dough blank so determined is greater or smaller than a target length plus or minus a given length offset, said second conveyor belt is controllable in a manner such that said raw dough blank reaches an end of said second conveyor belt for transfer to a container or to another conveyor by the continued circulation of said second conveyor belt, resulting in the raw dough blank being sorted out. and, if the length of the raw dough blank so determined corresponds to the target length plus or minus a given length offset, said second conveyor belt being controllable in such a manner that said second conveyor belt transports raw dough blank until it assumes a centered position relative to the longitudinal axis of another conveyor, or of a transfer chute, for passage of the raw dough blank to the dough blank processing means.

6. Feeder assembly for raw dough blanks as claimed in claim 5, wherein said feeder assembly comprises means for transferring the raw dough blanks disposed centrally relative to the longitudinal axis of the transfer chute or of the other conveyor.

7. Feeder assembly for raw dough blanks as claimed in claim 6, wherein the means for transferring the raw dough blanks disposed centrally relative to the longitudinal axis of the transfer chute or of the other conveyor comprises a pusher device adapted to be driven mechanically, pneumatically, hydraulically or electrically.

8. Feeder assembly for raw dough blanks as claimed in claim 6, wherein, for transferring the raw dough blanks disposed centrally relative to the longitudinal axis of the transfer chute or of the other conveyor, said second conveyor belt is designed to form a "V-belt" comprising a pair of belts disposed to be parallel and contiguous and driven with the same speed, with said belts adapted to be rotated about an axis parallel with the longitudinal axis or with the longitudinal axis thereof from a first position for transporting the raw dough blanks in which the top runs of both said belts span a common plane to a second position in which the top runs of said belts assume a given angle relative to each other so that said raw dough blank may be transferred by gravitation to the underlying transfer chute or the underlying other conveyor.

9. A process of feeding raw dough blanks to processing means for processing said raw dough blanks, comprising the improvement wherein, at a beginning of the feeding process, the raw dough blanks are disposed on a first conveyor belt and are transferred from said first conveyor belt to a second conveyor belt, said process including the step of operating the second conveyor belt with a speed of said second conveyor belt being higher by a given amount than that of the first conveyor belt, resulting in stretching of the raw dough blanks which are aligned to be parallel with a direction of movement of said second conveyor belt when being transferred from said first conveyor belt to said second conveyor belt, a sensor being provided wherein the process includes the step of sensing an end extending away from said first conveyor belt of said raw dough blank when transported by and arriving on said second conveyor belt, with said sensor being damped by said end and maintaining a damped response for a damping time until said raw dough blank is not within a detection range of said sensor any longer due to the movement of said second conveyor belt, and a controller being provided wherein a length of the stretched raw dough blank aligned in the direction of movement of said second conveyor belt is determined in said controller on the basis of the damping time of said sensor and the speed of movement of said second conveyor belt, wherein, if the length determined of said raw dough blank is greater or smaller than a given target length plus or minus a given length offset, the second conveyor belt is controlled so that said raw dough blank reaches an end of said second conveyor belt for transfer to a container or another conveyor by continued circulation of conveyor belt, resulting in the raw dough blank being sorted out, and wherein, if the length determined for said raw dough blank corresponds to the target length plus or minus a given length offset, the raw dough blank is transported by said second conveyor belt until assuming a centered position relative to the longitudinal axis of another conveyor, or of a transfer chute, for passage of raw dough blanks to the dough blank processing means.

\* \* \* \* \*